(12) United States Patent
Weinans (10) Patent No.: US 11,350,259 B2
(45) Date of Patent: May 31, 2022

(54) WIRELESS PERIPHERAL

(71) Applicant: Catena Holding B.V., Delft (NL)

(72) Inventor: Geert Hendrik Weinans, Klijndijk (NL)

(73) Assignee: Catena Holding B.V., Delf (NL)

( * ) Notice: Subject to any disclaimer, the term of this patent is extended or adjusted under 35 U.S.C. 154(b) by 0 days.

(21) Appl. No.: 17/016,886

(22) Filed: Sep. 10, 2020

(65) Prior Publication Data

US 2021/0092579 A1    Mar. 25, 2021

(51) Int. Cl.
*H04W 4/80* (2018.01)
*H04L 101/681* (2022.01)
*H04R 1/10* (2006.01)
*H04W 84/20* (2009.01)

(52) U.S. Cl.
CPC .......... *H04W 4/80* (2018.02); *H04L 61/6081* (2013.01); *H04R 1/1041* (2013.01); *H04R 2420/07* (2013.01); *H04W 84/20* (2013.01)

(58) Field of Classification Search
CPC ...... H04W 4/80; H04W 84/20; H04R 1/1041; H04R 2420/07; H04L 61/6081
USPC ....................................................... 455/41.3
See application file for complete search history.

(56) References Cited

U.S. PATENT DOCUMENTS

| | | | |
|---|---|---|---|
| 9,492,741 B2 * | 11/2016 | Russo | H04W 72/02 |
| 10,159,105 B1 | 12/2018 | Linsky et al. | |
| 2002/0003792 A1 * | 1/2002 | Schmidl | H04L 1/1614 370/343 |
| 2015/0092545 A1 * | 4/2015 | Katar | H04L 1/0078 370/230 |
| 2017/0318070 A1 * | 11/2017 | Zaitsev | H04L 67/02 |
| 2017/0338935 A1 * | 11/2017 | Ahn | H04W 72/0446 |
| 2018/0084569 A1 | 3/2018 | Li et al. | |
| 2019/0068324 A1 * | 2/2019 | Taniguchi | H04L 1/0045 |
| 2020/0252993 A1 * | 8/2020 | Srivastava | H04W 4/80 |

* cited by examiner

*Primary Examiner* — Eugene Yun (57) ABSTRACT

The disclosure relates to a wireless peripheral for wireless communication with a master device. Example embodiments disclosed include a wireless peripheral for wireless communication with a master device and comprising a first peripheral device and a second peripheral device, wherein: at least one of the first peripheral device (500*a*) and the second peripheral device is arranged to communicate with the master device (100) by transmitting and receiving first wireless signals conveying first packets occupying transmit and receive time slots comprising inter-frame space; and the first peripheral device and the second peripheral device are arranged to communicate with each other by transmitting and receiving second wireless signals conveying second packets within said inter-frame space.

19 Claims, 8 Drawing Sheets

WIRELESS PERIPHERAL

CROSS-REFERENCE TO RELATED APPLICATIONS

This application claims the priority under 35 U.S.C. § 119 of European patent application no. 19196955.9, filed Sep. 9, 2019 the contents of which are incorporated by reference herein.

FIELD

The disclosure relates to a wireless peripheral for wireless communication with a master device.

BACKGROUND

Bluetooth has been in existence for almost two decades and has become a dominant technology in the wireless ad-hoc personal networking space. The technology was invented in the early 1990s and was designed in accordance with the technical constraints of the technology at that point in time. Due to the success of Bluetooth and the vast installed base of supporting devices, backwards compatibility is paramount. Therefore, when extending the application of Bluetooth communication to new use cases, e.g. true wireless headphones, it is very important to retain the original format of the Bluetooth connections, as defined in the relevant standards. This is especially true for Bluetooth audio where it is important to respect the available bandwidth and packet scheduling in order to guarantee the expected level of robustness.

Figure 1:
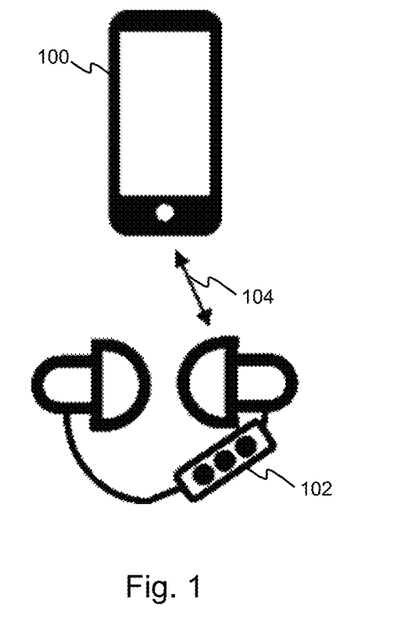
FIG. 1 illustrates classic Bluetooth audio streaming.

With reference to FIG. 1, classic Bluetooth streaming defines the roles of a source/gateway/master 100 and sink/hands-free/slave 102 which communicate by transmitting and receiving wireless signals 104 between themselves, modulated so as to convey packets according to the Bluetooth standard. These are one to one roles. This kind of architecture works fine for over the ear headphones 102, where the left and right speakers are connected using a wire, but is no longer acceptable for true wireless earbuds which are not connected together with a wired connection. The demand for true wireless earbuds requires removal of the wire between the two earbuds without letting the original source 100 know. However, these true wireless devices are challenging in terms of timing and buffering characteristics.

Figure 2:
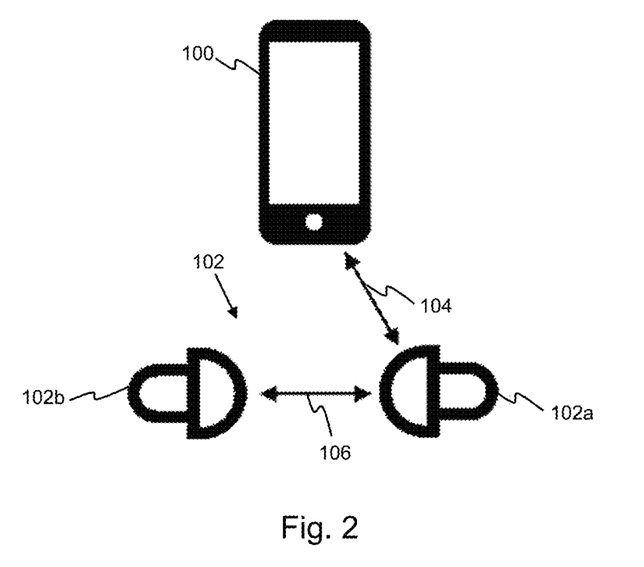
FIG. 2 illustrates classic true wireless Bluetooth audio streaming.

With reference to FIG. 2, Bluetooth classic true wireless has extended the sink/hands-free role to be split into a primary 102a and secondary 102b sink/hands-free. The goal of Bluetooth classic true wireless is to hide the existence of the secondary sink/hands-free 102b from the source 100. In other words, as far as the source 100 is concerned the secondary device 100b does not exist and it only deals with the primary device 102a, as if it were classic sink/hands-free 102. It is the responsibility of the primary device 100a to make the secondary device 100b operate. The source 100 and the primary device 102a communicate by transmitting and receiving first wireless signals 104 between them in analogy to FIG. 1, whereas the primary device 102a and the secondary device 102b communicate by transmitting and receiving second wireless signals 106 between themselves. In the Bluetooth classic true wireless system, the first and second signals are both modulated to packets according to the Bluetooth standard.

Bluetooth audio streaming is achieved using streams and buffers. Both sides of the Bluetooth link contain an audio buffer to manage unavoidable temporary interruptions of the wireless link. In general, Bluetooth audio devices are body worn devices and the human body impacts the signal performance between the devices. Scattered packet loss and body blocking of ~100 ms are very common during normal usage. The robustness of a Bluetooth audio streaming solution is very much related to the management of the streaming buffers between the combination of the source and the sink. Reducing the capacity or recovery behaviour of the sink will result in an increased number of skips in the rendered audio on the sink side. Buffers on the source side have to deal with temporary connection issues of the Bluetooth link. These buffers are limited in size.

In a repeating solution, the primary sink 102a transmits the received packets from the source 100 onwards to the secondary sink 102b. The more data that needs to be repeated between the primary 102a and secondary 102b sinks, the less time the primary sink 102a can spend listening to the source 100 in order to maintain sufficient buffer levels. Such repeating solutions are relatively easy to implement, but are not very efficient. This is because both the source 100 and the secondary sink 102b are competing for the bandwidth of the primary sink 102a and critical situations can quickly lead to starvation of the connections. Repeating solutions are scheduling and power inefficient. All the received data is transparently repeated from the primary sink to the secondary sink. The data contains stereo information while the secondary sink only requires a single channel.

Other solutions are known such as forwarding and sniffing. Forwarding solutions rely on the primary sink 102a to process and optimize the received packets from the source 100 before transmitting to the secondary sink 102b. Sniffing solutions are based on the assumption that the signal quality between the secondary sink 102b and the source 100 are in general fine. The secondary sink 102b will listen and capture packets (sniffing) between the source 100 and the primary sink 102a. The secondary sink 102b will request for retransmissions in case a packet is missed. In case the secondary sink 102b is missing the packet multiple times, the primary sink 102a will resume the link and forward the missing packet to the secondary sink 102b using a (scatternet) connection between the primary and secondary sinks. However, in all of the known classic true wireless solutions, the source is not guaranteed to always have the attention of the primary sink 102a, which places strain on buffers and can lead to interruption of the audio stream.

It is an object of the present disclosure to provide an improved solution for handling Bluetooth streaming between a source and a wireless peripheral device comprising two or more separate wireless elements, for example true wireless earbuds.

SUMMARY

According to a first aspect of the present disclosure, there is provided a wireless peripheral for wireless communication with a master device. The wireless peripheral comprises a first peripheral device and a second peripheral device. At least one of the first peripheral device and the second peripheral device is arranged to communicate with the master device by transmitting and receiving first wireless signals conveying first packets occupying transmit and receive time slots comprising inter-frame space. The first peripheral device and the second peripheral device are arranged to communicate with each other by transmitting and receiving second wireless signals conveying second packets within said inter-frame space.

Embodiments of the present disclosure exploit the inter-frame space for communication between the two peripheral devices forming the wireless peripheral. Advantageously, this makes use of the inter-frame space for communications without interfering with communication with the master/source and whilst remaining completely transparent to the master. This is referred to herein as inter-frame space communications (IFSC). The master/source may be a mobile phone and the wireless peripheral may be a pair of wireless earbuds.

In some embodiments, the first packets comprise audio stream data and the second packets comprise a subset of said audio stream data. For example, the subset of the audio stream data may be a mono channel of a stereo audio stream.

In some embodiments, the first peripheral device and the second peripheral device are arranged to communicate with the master device according to the Bluetooth basic rate standard and/or the Bluetooth enhanced data rate standard. The first packets may therefore be packet types defined according to at least one of those standards.

In some embodiments, at any given point in time only one of the first peripheral device and the second peripheral device is arranged to communicate with the master device. The first peripheral device and the second peripheral device may be arranged to switch roles (IFSC master and IFSC slave) in dependence on signal strength characteristics with the master device. For example, if the second peripheral device would actually have a better radio-frequency connection with the master than the first peripheral device, the two peripheral devices may switch the roles of IFSC master and IFSC slave, such that the second peripheral device becomes responsible for communications with the master.

In some embodiments, the first peripheral device and the second peripheral device comprise unique first and second private addresses respectively for pairing between themselves. Either the first peripheral device or the second peripheral device may pair with the master device using a single virtual address, distinct from the first and second private addresses, which is switchable between the first peripheral device and the second peripheral device. It should be appreciated that switching the virtual address between the two peripheral devices effectively switches the IFSC master and IFSC slave roles between the two peripheral devices.

In some embodiments, the second packets comprise handshake packets and/or data packets and/or voice packets.

In some embodiments, the first peripheral device and the second peripheral device are arranged to transmit and receive the handshake packets in inter-frame space corresponding to transmit time slots of the master device.

In some embodiments, the first peripheral device and the second peripheral device are arranged to transmit and receive the data packets in inter-frame space corresponding to receive time slots of the master device.

In some embodiments, the handshake packets and the data packets are concatenated.

In some embodiments, the first peripheral device and the second peripheral device are arranged to transmit and receive the voice packets within inter frame space corresponding to both transmit and receive slots of the master.

In some embodiments, the first wireless signals and the second wireless signals occupy different radio-frequency channels.

According to a second aspect of the present disclosure, there is provided a method of wireless communication with a master device using a wireless peripheral which comprises a first peripheral device and a second peripheral device. At least one of the first peripheral device and the second peripheral device communicates with the master device by transmitting and receiving first wireless signals conveying first packets occupying transmit and receive time slots comprising inter frame space. The first peripheral device and the second peripheral device communicate with each other by transmitting and receiving second wireless signals conveying second packets within said inter frame space.

Optional and advantageous features mentioned above relating to the first aspect may also apply, mutatis mutandis, to the second aspect.

BRIEF DESCRIPTION OF DRAWINGS

Embodiments will be described, by way of example only, with reference to the drawings, in which.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

Figure 3:
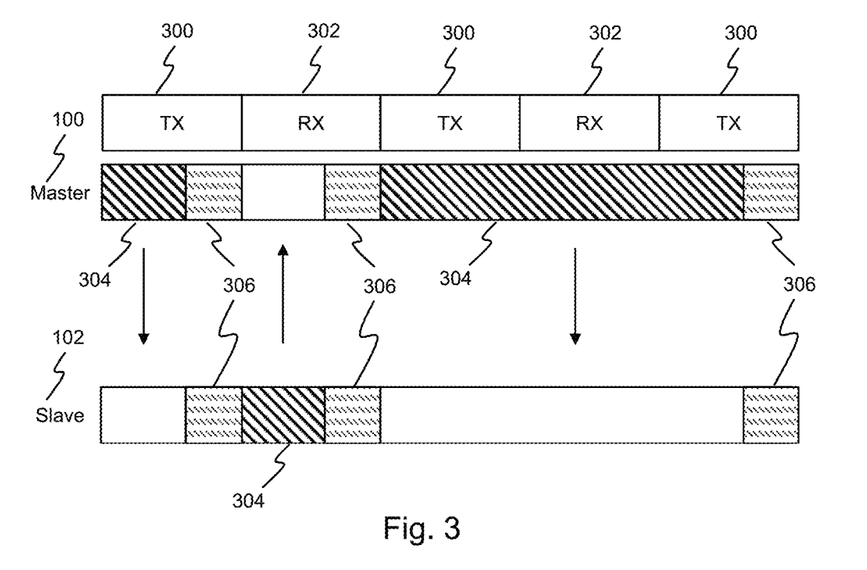
FIG. 3 illustrates Bluetooth packet transmission in transmit and receive time slots.

With reference to FIG. 3, Bluetooth is based on time slots. Specifically, transmit (TX) slots 300 and receive (RX) slots 302, seen from the perspective of the master device 100, e.g. a mobile phone, alternate with an interval of 625 µs. The master 100 may transmit packets 304 to the slave/sink 102 in the TX slot 300 and listen for packets 304 from the slave 102 in the RX slots 302. The master and slave devices change radio frequency (RF) channel every slot.

Figure 4:
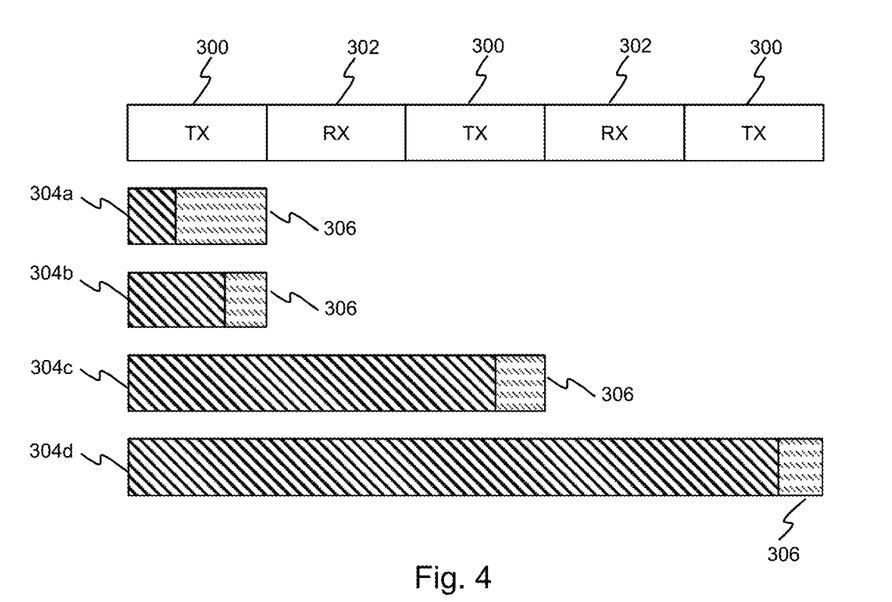
FIG. 4 illustrates different Bluetooth data packet types.

With reference to FIG. 4, for some packet types, 3 or 5 adjacent slots are concatenated into a lager multi-slot. For example, FIG. 4 illustrates a NULL/POLL packet 304a occupying 1 slot, a DH1 packet 304b occupying 1 slot, a DH3 packet 304c occupying 3 slots and a DH5 packet 304d occupying 5 slots. In between any of the packets there is inter-frame space 306 (IFS). Depending on the length of the packet transmitted or received in the slot, the IFS can be of considerable size and has a guaranteed minimum length of 189 µs.

The Bluetooth specification defines a list of packet types. These packet types each have their own minimum and maximum lengths. As mentioned above, some stretch into multiple slots and some are only used in specific situations, e.g. for connection establishment. Tables 1 to 3 show the number of slots and minimum and maximum IFS for each packet type.

TABLE 1

General Packets

| Packet type | Slots | Min IFS (us) | Max IFS (us) |
| --- | --- | --- | --- |
| ID | 0.5 | 245 | 245 |
| NULL | 1 | 499 | 499 |
| POLL | 1 | 499 | 499 |
| FHS | 1 | 244 | 244 |
| AUX1 | 1 | 259 | 491 |

TABLE 2

Data Packets

| Packet type | Slots | Min IFS (us) | Max IFS (us) |
| --- | --- | --- | --- |
| DM1 | 1 | 199 | 409 |
| DH1 | 1 | 227 | 443 |
| 2DH1 | 1 | 233 | 449 |
| 3DH1 | 1 | 239 | 460 |
| DM3 | 3 | 189 | 1644 |
| 2DH3 | 3 | 231 | 1699 |
| DH3 | 3 | 221 | 1685 |
| 3DH3 | 3 | 238 | 1710 |
| DM5 | 5 | 209 | 2894 |
| 2DH5 | 5 | 233 | 2949 |
| DH5 | 5 | 223 | 2935 |
| 3DH5 | 5 | 237 | 2960 |

TABLE 3

Voice Packets

| Packet type | Slots | Min IFS (us) | Max IFS (us) |
| --- | --- | --- | --- |
| HV1 | 1 | 259 | 259 |
| HV2 | 1 | 339 | 339 |
| 2EV3 | 1 | 233 | 233 |
| HV3 | 1 | 259 | 259 |
| EV3 | 1 | 243 | 243 |
| 3EV3 | 1 | 236 | 236 |
| DV | 1 | 262 | 382 |
| EV4 | 3 | 309 | 309 |
| 2EV5 | 3 | 283 | 283 |
| EV5 | 3 | 293 | 293 |
| 3EV5 | 3 | 286 | 286 |

Embodiments of the present disclosure exploit the IFS 306 for communication between a secondary and primary sink without interfering with the original Bluetooth protocols and timings and whilst remaining transparent to the source. This is referred to herein as inter-frame space communications (IFSC). The IFS 306 was originally intended to allow RF devices sufficient time to switch between different channels for Bluetooth frequency hopping to occur. However, the inventor has appreciated that modern RF implementations require much less time to switch radio-frequency channels and this provides an opportunity to use at least some of this previously allocated time, i.e. the IFS, in a different way.

Figure 5:
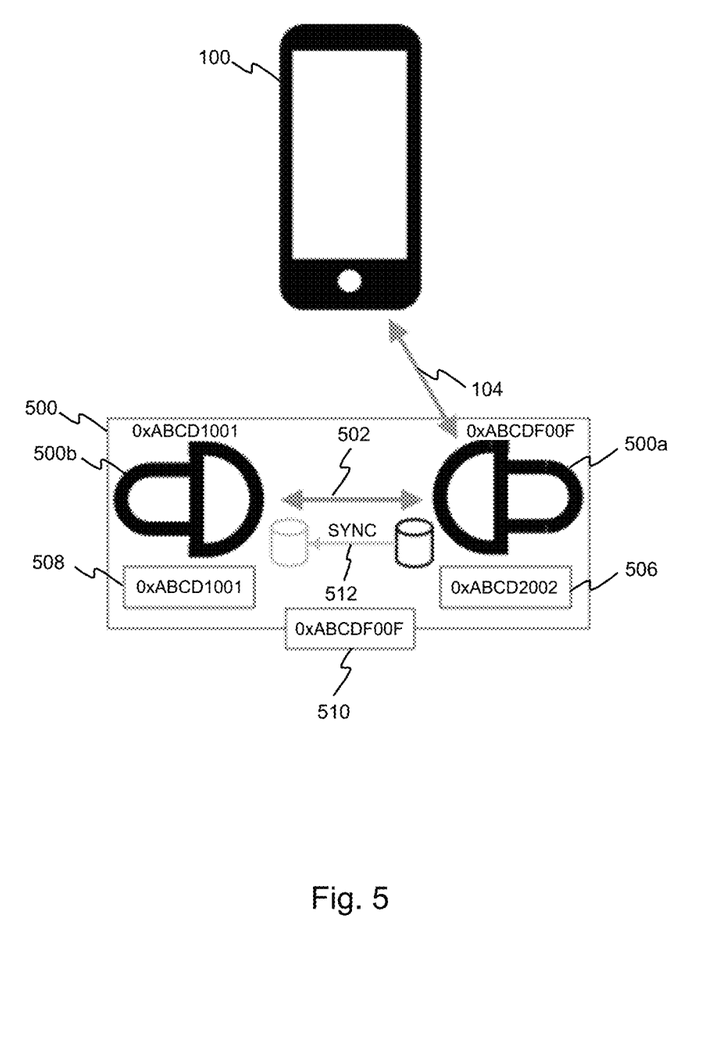
FIG. 5 illustrates a wireless peripheral according to the present disclosure.

With reference to FIG. 5, according to embodiments of the present disclosure a wireless peripheral 500, e.g. a pair of wireless headphones/earbuds, is arranged to communicate wirelessly with a source/master device 100, e.g. a mobile phone. The wireless peripheral 500 comprises a first (IFSC master) peripheral device 500a and a second (IFSC slave) peripheral device 500b. The first peripheral device 500a is arranged to communicate with the master device 100 by transmitting and receiving first wireless signals 104 according to the conventional Bluetooth standard, e.g. Bluetooth basic rate (BR) and/or Bluetooth enhanced data rate (EDR). As such, the wireless signals 104 convey packets 304 between the master device 100 and the master peripheral device 500a of the types described above, e.g. general packets, data packets and/or voice packets as defined by the Bluetooth standard and as listed in Tables 1-3. The packets 304 conveyed between the master 100 and the first peripheral device 500a therefore occupy TX slots 300 and RX slots 302 slots having IFS 306, as required by the Bluetooth standard. In embodiments, the first peripheral device 500a and the second peripheral device 500b are arranged to communicate with each other by transmitting and receiving second wireless signals 502 within the inter-frame space 306. These second wireless signals 502 are modulated so as to convey second packets between the first peripheral device 500a and the second peripheral device 500b, e.g. handshake packets, data packets and the like. In embodiments, the first packets may comprise audio stream data and the second packets may comprise a subset of the audio stream data. For example, the first packets may comprise stereo audio stream data whilst the second packets comprise only single-channel, mono portion of the stereo audio stream data.

The first peripheral device 500a has a private address 506 and the second peripheral device 500b also has a private address 508, different from the private address 506 of the first peripheral device 500a. These private addresses are used for IFSC communications between the first peripheral device 500a and the second peripheral device 500b and are in general not revealed to the master 100. A virtual paired address 510 is used by either the first peripheral device 500a or the second peripheral device 500b to establish a Bluetooth connection with the master 100. In other words, pairing relationships with the master 100 are attached to the virtual paired address 510 which can be transferred between the two IFSC devices (first and second peripheral devices). Thus when the second peripheral device 500b has a better potential connection with the master 100 than the first peripheral device 500a has with the master 100, the two IFSC devices can swap roles such that the former IFSC master becomes the slave and vice versa. Since the IFSC devices connect to the master 100 using the same virtual paired address, the master device 100 need not know that the role switch has occurred, i.e. it is seamless to the master device 100.

Two modes may be considered: passive diversity and active diversity. In passive diversity, the two IFSC devices (i.e. first peripheral device 500a and second peripheral device 500b) decide for the devices to switch roles, such that the former master becomes the new slave and vice versa. However the devices may need to wait until the ongoing connection with the master 100 is detached. For the next connection, the devices switch roles and the former master becomes the new slave device. Whereas the former slave will be able to participate in new connections using the virtual paired address 510, the new slave device will return to using its own unique Bluetooth address 506. For passive diversity, only the security information needs to be synchronized between the two IFSC devices using a sync event 512. Other administrations are renewed upon establishing a new connection. In active diversity, the IFSC devices are capable of switching the master and slave roles on the fly. The IFSC master will keep the IFSC slave up to date for administrations via the IFSC connection. In case the devices want to switch roles, the IFSC master 500a puts the Bluetooth classic connection with the source 100 in Bluetooth hold mode. The IFSC slave 500b will take over the responsibilities and starts using the virtual paired address 510. The former IFSC slave 500b has become the new IFSC master 500a and the former IFSC master 500a has become the IFSC slave 500b and goes back to using its unique Bluetooth Address 506.

Figure 6:
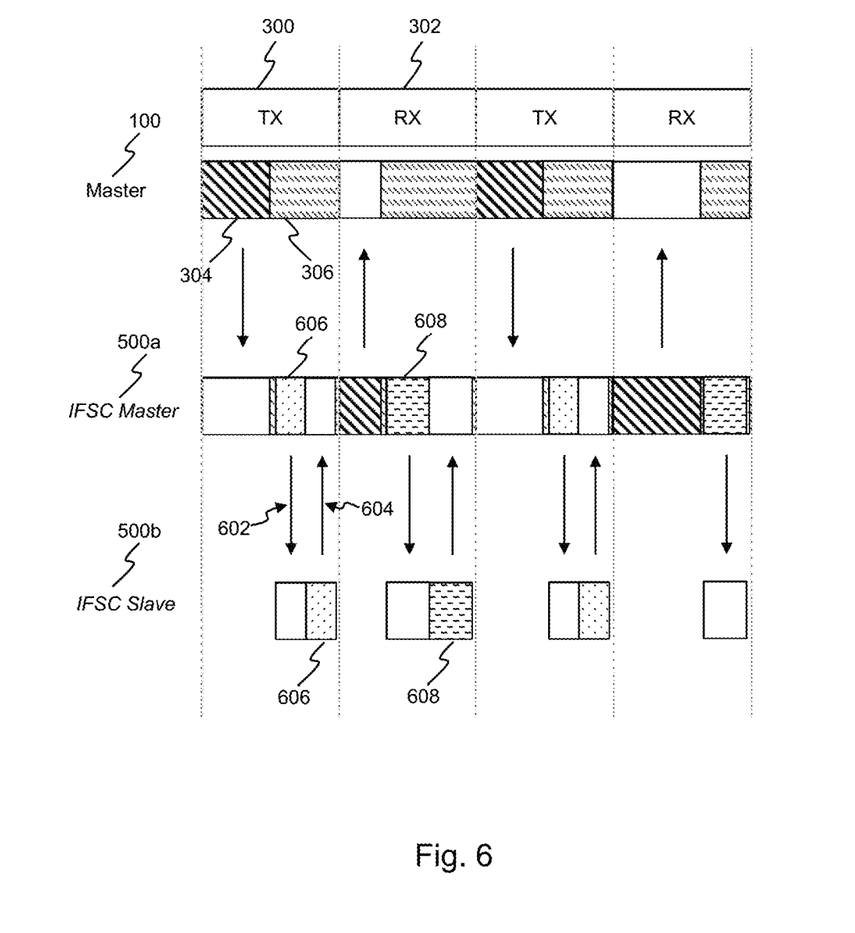
FIG. 6 illustrates packet transmission and reception between a master; first peripheral device and a second peripheral device.

With reference to FIG. 6, IFSC uses transmit events 602 (from the first peripheral device 500a to the second peripheral device 500b) and receive events 604 (from the second peripheral device 500b to the first peripheral device 500a) within the IFS 306 of the TX slot 300 and RX slot 302 as the basis for IFSC communications between the first peripheral device 500a and the second peripheral device 500b. Regardless of the length of the IFS 306 in the TX slot 300, IFSC may only use the guaranteed last part of the IFS space in the TX slot 300 for communication between the first peripheral device 500a and the second peripheral device 500b. This allows this space to be used at the end of every packet 304 transmitted from the master 100 to the first peripheral device 500a, no matter what kind of packet it is. It therefore also provides a clear time base.

The IFS space available in the TX slot 300 is referred to herein as IFSC handshake space. The type of packets transmitted between the first peripheral device 500a and the second peripheral device 500b in the TX slot may therefore be described as IFSC handshake packets 606. The handshake may be used to keep IFSC devices 500a, 500b connected to each other and to provide them with some basic status. Additionally the handshake may be used to indicate how the following IFSC data space, described below, is to be used and where it is located in time relative to the handshake.

The IFSC data space is allocated in the RX slot 302 following the TX slot 300. The size and usage of the IFSC data space is dependent on the type and length of the conventional Bluetooth packet 304 transmitted from the first peripheral device 500a to the master 100 in the RX slot 302. The usage of the IFSC data space is selected dynamically and may only be selected once it is clear what kind of conventional packet 304 is going to be transmitted from the IFSC master 500a to the master 100 in the RX slot 302 following the TX slot 300. IFSC data packets 608 are shared between the first peripheral device 500a and the second peripheral device 500b within the IFSC data space. It should be appreciated that when the conventional Bluetooth packet 304 transmitted from the master 100 to the first peripheral device 500a is a multi-slot packet, there is no IFS 306 in the middle of the packet, and therefore only a single IFS at the end of the packet is available for IFSC communications between the peripheral devices.

Figure 7:
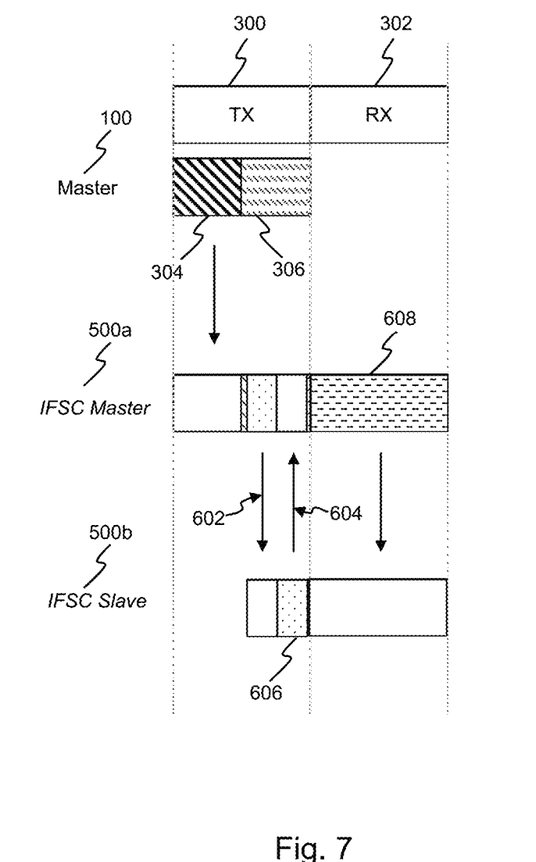
FIG. 7 illustrates concatenation of handshake and data packets.

With reference to FIG. 7, if there is no conventional Bluetooth transmit event planned from the first peripheral device 500a to the master 100 in the RX slot 302 following the TX slot 300, IFSC also allows the IFSC handshake space and the IFSC data space to be concatenated into a single space, such that the data packet 608 directly follows the handshake packet 606. It should be appreciated that this maximises the amount of available space for IFSC communication between the first peripheral device 500a and the second peripheral device 500b.

Figure 8:
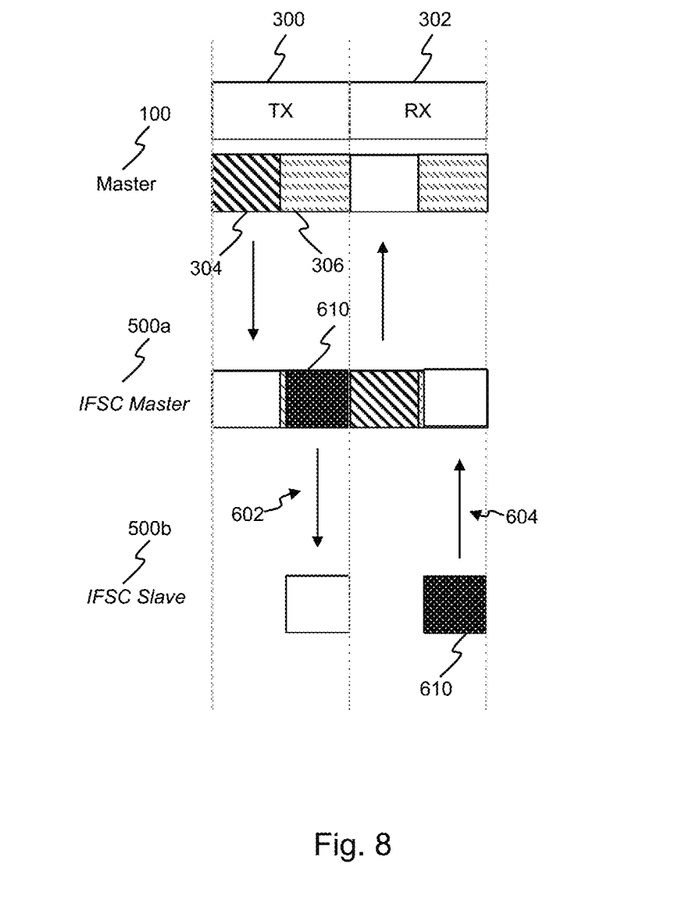
FIG. 8 illustrates voice packet transmission.

With reference to FIG. 8, in some embodiments, IFSC voice mode is an additional mode which can be enabled. In this case, there are no handshakes involved between the first peripheral device 500a and the second peripheral device 500b and instead only IFSC voice packets 610 may be transmitted between the first peripheral device 500a and the second peripheral device 500b. The IFSC voice packers 610 may be shared between the two IFSC devices in both the TX slot 300 and in the RX slot 302 of the conventional Bluetooth connection with the master. In the voice mode, the payload may be flushed before the next interval starts. The number of retransmission opportunities can be configured.

IFSC packets 606, 608, 610 are conveyed between the first peripheral device 500a (IFSC master) and the second peripheral device 500b (IFSC slave) on radio-frequency channels selected from a range of multiple channels. Depending on the modulation being used, IFSC may use, for example, 37 or 79 channels, although other numbers are contemplated. The type of modulation is configured during the connection establishment between the first peripheral device 500a and the second peripheral device 500b. Depending on configuration, IFSC may use a single channel for both the RX 604 and the TX 602 events, or alternatively independent channels may be used. It should be appreciated that IFSC communications between the first peripheral device 500a and the second peripheral device 500b should in general take place on a different radio-frequency channel compared to the conventional BR/EDR event between the master 100 and the first peripheral device 500a. This allows for devices continuing to transmit after the official packet or adding some proprietary transmissions in the same channel. As with the conventional BR/EDR connection between the master 100 and the first peripheral device 500a, the IFSC connection may also use frequency hopping and adapted frequency hopping (AFH). The channels selection algorithm may be the same as BR/EDR and the IFSC may hop with a specified distance from the selected BR/EDR channels. In embodiments, the modulation used for IFSC Handshake packets 606 is the same as Bluetooth uses for the LE2 mode. In embodiments, the modulation used for IFSC data packets 608 is equal to the modulation used for the EDR part of EDR-2 packets. However, unlike BR/EDR, IFSC may not switch during the packet, such that the whole packet may use a single modulation type.

An exemplary discussion of packet types and transports suitable for IFSC is now provided. However, the person skilled in the art would appreciate that certain implementation details are exemplary only and that the general concept of IFSC communication disclosed herein could be implemented using variations of the packet types and transports disclosed herein. From the link layer perspective, logical transports are provided for the IFSC handshake and IFSC data events. The handshake transport is used to exchange status information between the IFSC master 500a and IFSC slave 500b devices. Additionally, it is used to announce activity on the logical data transport following the handshake event. The data transport is used to transport the actual data between the IFSC devices inside the IFSC space available for data events.

Logical links are also provided. For example, logical addressing in the packet header allows addressing of multiple slaves in a network. The header contains a bit indicating if the packet contains control or data payload. The control and data links may be considered totally separated as it comes to flow control and retransmissions. This allows the control packets to get a higher priority compared to the (retransmitting) data packets. Control packets are short packets which will fit in the smallest IFSC data Space. Control packets are not fragmented and will in general be identical on retransmission. Data packets are of variable length and may be adapted to the available IFSC data space. Data packets for retransmissions can be of different length than the original data packet that failed transmission. A different kind of link is related to the BR/EDR (e)SCO connections, used for voice. For this connection there is a particular relationship between the BR/EDR packets and the IFSC packets. The ISFC Voice packets are transmitted in the IFS Space of the (e)SCO packet. There is an independent scheme for potential retransmissions.

Figure 9A:
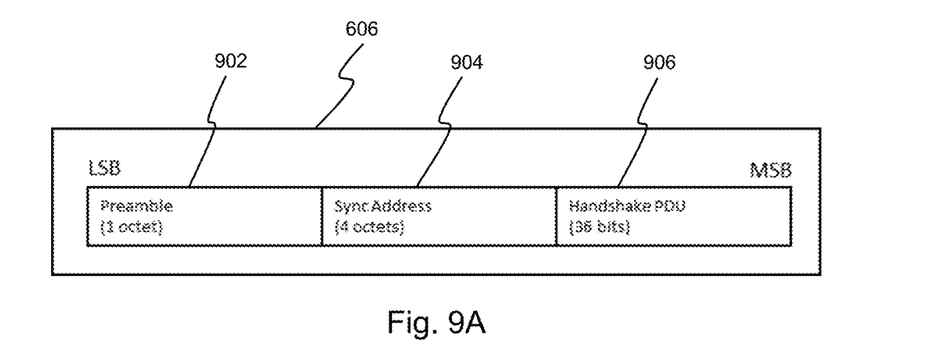
FIGS. 9A to 9G illustrate different packet types according to the present disclosure.
Figure 9B:
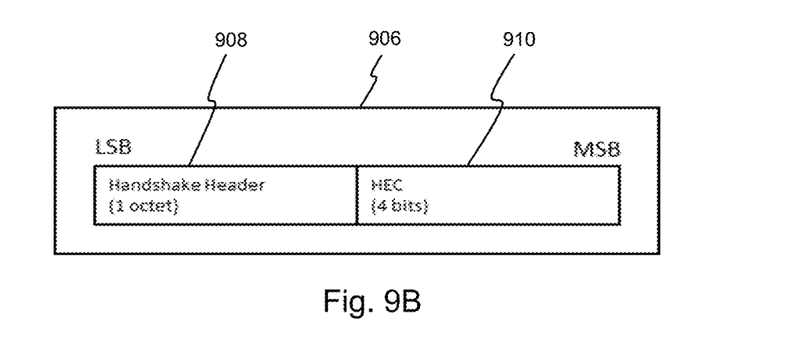

A variety of exemplary IFSC packets are described with reference to FIGS. 9A to 9G. FIG. 9A illustrates an exemplary handshake packet 606 comprising a pre-amble 902, a sync address 904 and a handshake protocol data unit (PDU) 906. The handshake PDU 906, illustrated in FIG. 9B, comprises a handshake header 908 and a header error control/check (HEC) 910 and may be encoded using ⅓ rate forward error correcting (FEC). This should increase the sensitivity of the handshake packets.

Figure 9C:
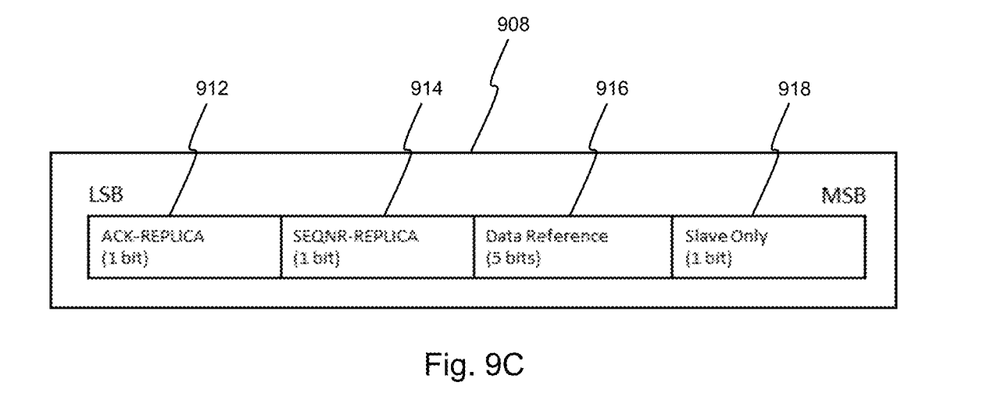

FIG. 9C illustrates the handshake header 908 for the master in more detail. ACK-REPLICA 912 and SEQNR-REPLICA 914 are replicas of the ACK and SEQNR which would be part of the data packet header. This is used in case the data event is skipped due to no available data to transmit. The IFSC master can use this to acknowledge the last transmitted data packet and the IFSC slave can use this to acknowledge the last packet received from the IFSC master and prevent the IFSC master from retransmitting in case the slave has no data to send. Data Reference 916 is a pointer to the location of the data following this handshake and takes the form:

0x00 . . . 0x1D
[Slot Offset, Time Offset]
Slot Offset=0 . . . 4
Time Offset={200, 300, 400, 500, 625}
0x1E=Empty/Null/Poll Packet
0x1F=No Data Following Slave Only 918 being set means that the IFSC master will not start any transmission at the data reference point, but expects the IFSC slave to start transmitting.

Figure 9D:
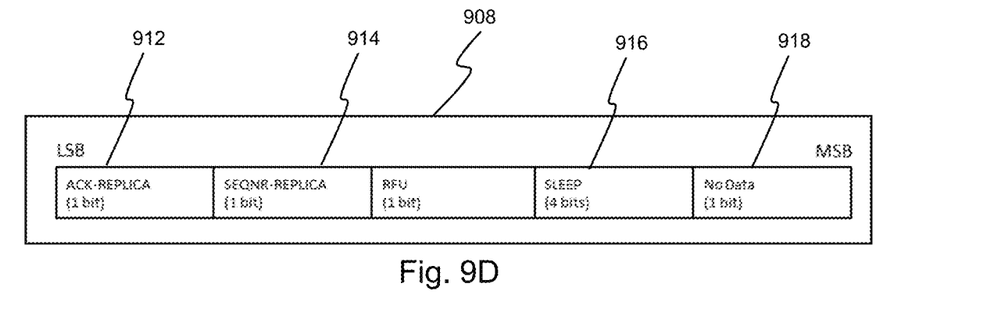

FIG. 9D illustrates the handshake header 908 for the slave in more detail which also has ACK-REPLICA 912 and SEQNR-REPLICA 914. SLEEP 916 can take values 0x00 . . . 0x0F. The SLEEP value indicated the number of planned handshake events the slave is planning to skip. The slave may skip the events for power savings reasons. The slave may try to determine a pattern in the arrival of data and optimize the reception to this pattern. The master does not need to transmit the handshakes, however the master could also continue and allow the slave to change its mind due to new or changed circumstances. No Data 918 means that the slave has no data to transmit. There is no need for the master to acknowledge the slave for data using an event.

Figure 9E:
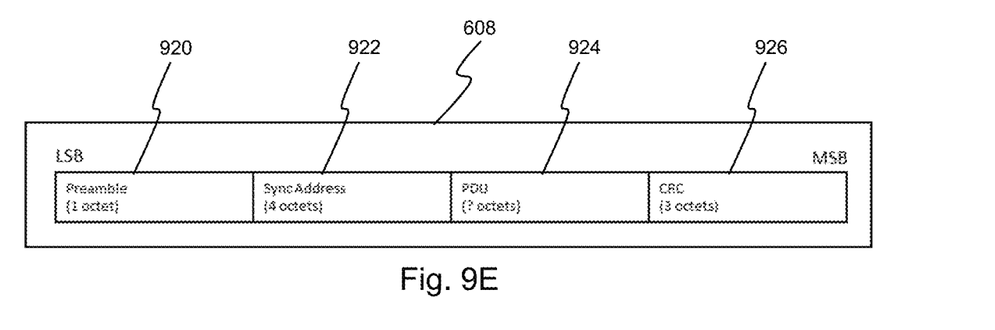
Figure 9F:
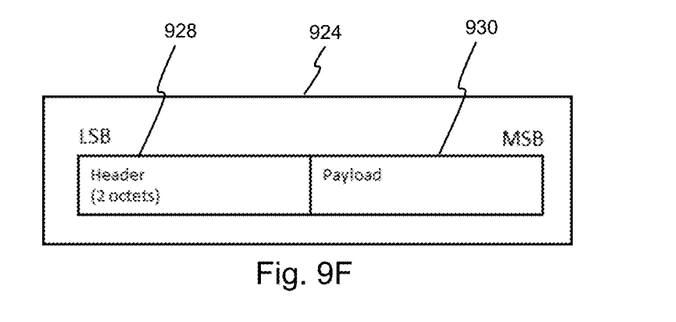
Figure 9G:
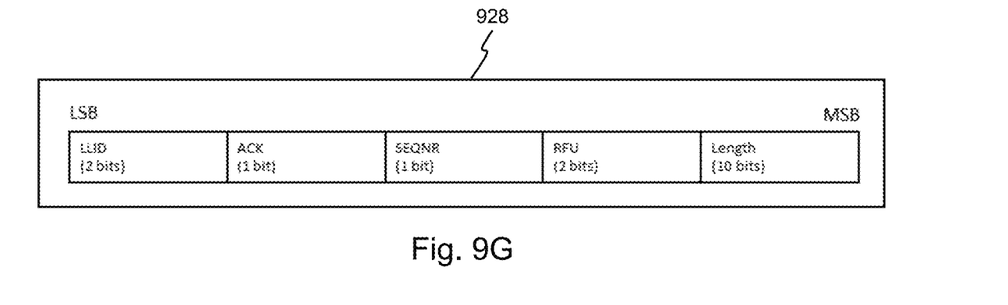

FIG. 9E illustrates an exemplary IFSC data packet 608 in more detail. The data packet comprises a preamble 920, a sync address 922, a PDU 924 and a CRC 926. The number of octets in PDU 924 will vary with the length of the data payload. As shown in FIG. 9F, the data packet PDU 924 will comprise a header 928 of 2 octets together with the payload 930 of variable length. FIG. 9G illustrates the data packet header 928 in more detail.

It should be appreciated that in addition to providing a robust channel for classic Bluetooth true wireless solutions, IFSC can also support any other solution where devices need to be connected in conjunction with Bluetooth classic and without interfering with this classic connection. For example, remote controls for hearing aids or hearables, of gathering or presenting (sensor) data can take place using IFSC.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality and reference signs in the claims shall not be construed as limiting the scope of the claims.

The invention claimed is:

1. A wireless peripheral for wireless communication with a master device, the wireless peripheral comprising:
   a first peripheral device and
   a second peripheral device,
   wherein at least one of the first peripheral device and the second peripheral device is arranged to communicate with the master device by transmitting and receiving first wireless signals conveying first packets occupying transmit and receive time slots in a first channel,
   wherein at least one of the time slots include an inter-frame space;
   wherein the first peripheral device and the second peripheral device are arranged to communicate with each other by transmitting and receiving second wireless signals conveying second packets within the inter-frame space;
   wherein the first peripheral device,
      identifies a time period required for the master device to switch from the first channel to a second channel;
      communicates with the second peripheral device only before the time period ends; and
   wherein the time period is less than the inter-frame space;
   wherein the first peripheral device,
      identifies a set of time periods required by additional devices within a wireless communications range to switch from the first channel to the second channel;
      communicates with the second peripheral device only before a smallest of the set of time periods ends; and
   wherein the set of time periods are less than the inter-frame space.

2. The wireless peripheral according to claim 1, wherein the first packets comprise audio stream data and the second packets comprise a subset of said audio stream data.

3. The wireless peripheral according to claim 1, wherein the first peripheral device and the second peripheral device are arranged to communicate with the master device according to one of Bluetooth basic rate standard and Bluetooth enhanced data rate standard; and
   wherein the first packets are packet types defined according to at least one of the Bluetooth basic rate standard and the Bluetooth enhanced data rate standard.

4. The wireless peripheral according to claim 1, wherein at any given time only one of the first peripheral device and the second peripheral device is arranged to communicate with the master device, whereby the first peripheral device and the second peripheral device are arranged to switch roles in dependence on signal strength characteristics with the master device.

5. The wireless peripheral according to claim 1, wherein the first peripheral device and the second peripheral device comprise unique first and second private addresses respectively for pairing between themselves, and the first peripheral device or the second peripheral device pairs with the master device using a virtual address distinct from the first and second private addresses, the virtual address being switchable between the first peripheral device and the second peripheral device.

6. The wireless peripheral according to claim 1:
wherein the second packets include one or more of handshake packets, data packets and voice packets.

7. The wireless peripheral according to claim 6,
wherein the first peripheral device and the second peripheral device are arranged to transmit and receive the handshake packets within the inter frame space within the transmit time slots of the master device.

8. The wireless peripheral according to claim 6,
wherein the first peripheral device and the second peripheral device are arranged to transmit and receive the data packets within the inter frame space within the receive time slots of the master device.

9. The wireless peripheral according to claim 6,
wherein the handshake packets and the data packets are concatenated.

10. The wireless peripheral according to claim 6,
wherein the first peripheral device and the second peripheral device are arranged to transmit and receive the voice packets within the inter frame space within both the transmit and receive slots of the master device.

11. The wireless peripheral according to claim 1,
wherein the first wireless signals and the second wireless signals occupy different radio-frequency channels.

12. A method of wireless communication with a master device using a wireless peripheral comprising a first peripheral device and a second peripheral device the method comprising:

at least one of the first peripheral device and the second peripheral device communicating with the master device by transmitting and receiving first wireless signals conveying first packets occupying transmit and receive time slots in a first channel, wherein at least one of the time slots include an inter frame space; and the first peripheral device and the second peripheral device communicating with each other by transmitting and receiving second wireless signals conveying second packets within the inter frame space; and wherein the first peripheral device,
identifies a time period required for the master device to switch from the first channel to a second channel;
communicates with the second peripheral device only before the time period ends; and wherein the time period is less than the inter-frame space;
wherein the first peripheral device,
identifies a set of time periods required by additional devices within a wireless communications range to switch from the first channel to the second channel;
communicates with the second peripheral device only before a smallest of the set of time periods ends; and
wherein the set of time periods are less than the inter-frame space.

13. The method of claim 12
wherein the first packets comprise audio stream data and the second packets comprise a subset of said audio stream data.

14. The method of claim 12 wherein
the first peripheral device and the second peripheral device communicate with the master device according to one or both of Bluetooth basic rate standard and Bluetooth enhanced data rate standard and
the first packets are packet types defined according to one or both of the Bluetooth basic rate standard and the Bluetooth enhanced data rate standard.

15. The method of claim 12
wherein at any given time only one of the first peripheral device and the second peripheral device communicates with the master device, the first peripheral device and the second peripheral device switching roles in dependence on signal strength characteristics with the master device.

16. The method of claim 12 wherein
the first peripheral device and the second peripheral device comprise unique first and second private addresses respectively for pairing,
the first peripheral device or the second peripheral device pairing with the master device using a virtual address distinct from the first and second private addresses,
the virtual address being switchable between the first peripheral device and the second peripheral device.

17. The method of claim 12:
wherein the second packets include one or more of handshake packets, data packets and voice packets.

18. The method of claim 12:
wherein the second packets include handshake packets; and
wherein the first peripheral device and the second peripheral device transmit and receive the handshake packets within the inter frame space within the transmit time slots of the master device.

19. The method of claim 12:
wherein the second packets include handshake packets and data packets; and
wherein the handshake packets and the data packets are concatenated.

* * * * *